(12) United States Patent
Hu

(10) Patent No.: US 9,134,802 B2
(45) Date of Patent: Sep. 15, 2015

(54) GESTURE JUDGMENT METHOD USED IN AN ELECTRONIC DEVICE

(71) Applicant: LITE-ON IT CORPORATION, Taipei (TW)

(72) Inventor: Lieh-Kuang Hu, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 58 days.

(21) Appl. No.: 14/146,391

(22) Filed: Jan. 2, 2014

(65) Prior Publication Data

US 2014/0333523 A1    Nov. 13, 2014

(30) Foreign Application Priority Data

May 8, 2013   (CN) .......................... 2013 1 0167251

(51) Int. Cl.
*G06F 3/01* (2006.01)
*G06K 9/00* (2006.01)

(52) U.S. Cl.
CPC ............ *G06F 3/017* (2013.01); *G06K 9/00355* (2013.01)

(58) Field of Classification Search
CPC ......... G06F 3/01; G06F 3/005; G06F 3/0425; G06F 3/017; G06K 9/00355
See application file for complete search history.

(56) References Cited

U.S. PATENT DOCUMENTS

| | | | |
|---|---|---|---|
| 8,553,014 B2 * | 10/2013 | Holmgren et al. | 345/176 |
| 8,584,049 B1 * | 11/2013 | Zhai et al. | 715/863 |
| 2010/0027892 A1 * | 2/2010 | Guan et al. | 382/203 |
| 2011/0080490 A1 * | 4/2011 | Clarkson et al. | 348/222.1 |
| 2012/0027263 A1 * | 2/2012 | Liu et al. | 382/107 |
| 2013/0278499 A1 * | 10/2013 | Anderson | 345/156 |

* cited by examiner

*Primary Examiner* — Andrew Sasinowski
(74) *Attorney, Agent, or Firm* — Rabin & Berdo, P.C.

(57) ABSTRACT

A gesture judgment method used in an electronic device having frame capturing function is provided. A plurality of MHI (motion history image) angles/directions are obtained from a plurality of corresponding MHIs. Whether a current gesture control is valid is judged according to the MHI angles/directions. If the current gesture control is valid, then weight assignment is performed on the MHI angles/directions to obtain a judgment result of the current gesture control.

8 Claims, 2 Drawing Sheets

GESTURE JUDGMENT METHOD USED IN AN ELECTRONIC DEVICE

This application claims the benefit of People's Republic of China application Serial No. 201310167251.4, filed May 8, 2013, the subject matter of which is incorporated herein by reference.

BACKGROUND OF THE INVENTION

1. Field of the Invention

The invention relates in general to a gesture judgment method applicable to an electronic device, and more particularly to a method which judges a gesture according to motion history image (MHI).

2. Description of the Related Art

Currently, several technologies for identifying human behavior are provided. The motion history image (MHI) belongs to one of the technologies for identifying human behavior. The basic concept of MHI is that a "moving object" may be identified according to the difference between continuous motion images. The basic principle of MHI is that the differences between two images can be found by performing XOR or subtraction of absolute values on the bitmaps of two subsequent images. If the video camera does not move, the differences that are found relate to the image of the moving object.

To further improve accuracy level, the image blocks not matched to the requirements are ignored from consideration. For example, if the subtraction of absolute values of the same pixel on two frames is too small, then corresponding pixel, which may be noises recorded by the video camera, will be ignored. If a pixel block area is too small, then corresponding pixel(s) of the pixel block area will be ignored because this small-area pixel block may represent an image at a far distance and thus has a smaller area. Consequently, the judgment of moving direction is not based on the above situation.

The two continuous frames are represented by different gray scales. For newer frame, the gray scale values of reserved pixels are increased (for instance, the gray scale value is increased by 1); or, for older frame, the gray scale values of reserved pixels are decreased (for instance, the gray scale value is decreased by 1). MHI will be obtained accordingly. In MHI, the earlier the motion is, the dimmer the motion on the MHI, and the latter the motion is, the brighter the motion on the MHI. FIG. 1A is an exemplary diagram of a MHI. FIG. 1B is a schematic diagram showing moving directions of an object on the MHI of FIG. 1A. In FIG. 1B, a horizontal axis and a vertical axis represent a block, and one block includes 3*3 pixels in the MHI. How to obtain MHI is not a focus in the present invention, details thereof are omitted here.

Although the moving object can be found by using MHI, the gesture judgment based on one single MHI could lead to misjudgment if the direction of gesture motion cannot be affirmed. As a result, the output result about direction of gesture control is erroneous. Therefore, an embodiment of the disclosure provides a gesture judgment method which more accurately judges the moving direction of a gesture according to several MHIs and several auxiliary judgment criteria.

SUMMARY OF THE INVENTION

The invention is directed to a gesture judgment method, which judges a gesture and outputs an angle/direction of the gesture movement according to several MHI analyses.

According to one embodiment of the present invention, a gesture judgment method used in an electronic device having frame capturing function is provided. A plurality of MHI angles/directions are obtained from a plurality of corresponding MHIs. Whether a current gesture control is valid is judged according to the MHI angles/directions. If the current gesture control is valid, then weight assignment is performed on the MHI angles/directions to obtain a judgment result of the current gesture control.

The above and other contents of the invention will become better understood with regard to the following detailed description of the preferred but non-limiting embodiment(s). The following description is made with reference to the accompanying drawings.

DETAILED DESCRIPTION OF THE INVENTION

Figure 1A:
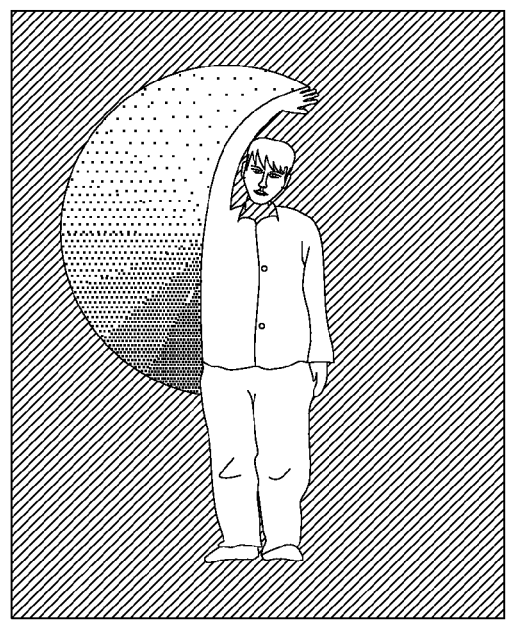
FIG. 1A is an exemplary diagram of a MHI.

Technical terms are used in the specification with reference to generally-known terminologies used in the technology field. For any terms described or defined in the specification, the descriptions and definitions in the specification shall prevail. The present invention relates to a gesture judgment method. For common technologies and theories which are not involved with the technical features of the present invention, the details will not be repeated. In addition, the shapes, sizes and scales of elements are schematically shown in the drawings for one skilled person in the art to understand the present invention, not for limiting the scope of implementation of the present invention.

Each embodiment of the present invention has one or more technical characteristics. Anyone who is skilled in the technology field of the present invention, based on the disclosure of the invention, can selectively implement some or all technical characteristics of any embodiment or selectively implement some or all technical characteristics of a plurality of embodiments according to design specifications or implementation requirements so as to increase the flexibility in the implementation of the invention.

The contents of embodiments of the invention are for people to understand the technology of the invention, not for limiting the scope of protection of the invention. Besides, given that each embodiment is implementable, anyone who is skilled in the technology field of the present invention can implement the invention by equivalent elements or procedures according to the disclosure of the invention. That is, the implementation of the invention is not limited to the embodiments disclosed in the invention. Given that the implementation and full disclosure of each embodiment of the invention are not affected, details of elements/procedures used for implementing the invention and details of the hardware device used for implementing the method of the invention are simplified or omitted in the description of the invention below.

Figure 1B:
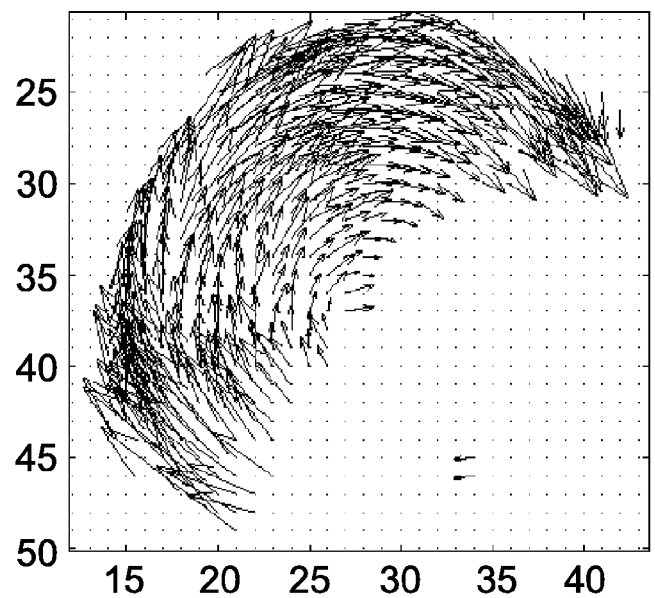
FIG. 1B is a schematic diagram showing moving directions of an object on the MHI of FIG. 1A.

Although the moving object can be found through MHI analysis, the result of judgment may comprise many different moving angles and the moving direction of the gesture cannot be accurately judged if the judgment of gesture is based on the analysis of one single MHI. Referring to FIG. 1B. The moving direction (that is, the direction of user's gesture) includes many angles such as upward angle, downward angle, leftward angle, rightward angle, top-rightward angle, bottom-rightward angle and so on. It can be seen from FIG. 1B that the MHI is divided into several blocks. In some blocks, the gesture is moving upward (↑), while in some other blocks, the gesture is moving upward (↑) and rightward (→). In the end block (where the motion of the gesture finishes), the gesture is moving downward (↓). This is because when the user controls his/her gesture, the user's hand is not stably moving towards the same direction. Therefore, the direction of gesture obtained from the analysis of one single MHI may include different angles/directions.

Normally, in a MHI, the moving angle/direction having highest occurrence number is used as the moving angle of the MHI. For example, as indicated in FIG. 1B, the occurrence number of the upward direction is 100, the occurrence number of the downward direction is 10, the occurrence number of the rightward direction is 50, and the occurrence number of the leftward direction is 50. Based on the analysis of the MHI of FIG. 1B, the gesture is judged as upward. However, the present embodiment of the invention does not directly adopt such judgment as the result of gesture judgment. Instead, the present embodiment of the invention introduces a number of auxiliary judgment criteria to accurately judge the gesture direction.

After the angle of the MHI (referred as MHI angle/direction hereinafter) is obtained, the present embodiment of the invention does not directly use the MHI angle/direction as a final decision on the current moving direction/angle of the user's gesture. Instead, the present embodiment of the invention obtains more MHI angles for judgment purpose. If too many continuous MHI angles/directions are obtained within the moving period of the gesture, this implies that the present gesture is moving too fast, and is thus regarded as an invalid gesture control. Conversely, if the quantity of continuous MHI angles/directions obtained within the moving period of the present gesture is too few, this implies that the present gesture is moving too slow, and is thus regarded as an invalid gesture control. Here, "the quantity of continuous MHI angles/directions" means if the MHI angle/direction can be obtained continuously in N times, the quantity of the continuous MHI angles/directions is N.

Let an infra-red (IR) light be used to capture frames for forming a MHI. If the scan frequency is 60 frames per second (under ideal circumstance, 60 MHIs are obtained per second), then the low threshold of continuous quantity of the MHI angle/direction may be set as 6, and the high threshold of continuous quantity of the MHI angle/direction is set as 18. However, the setting is for exemplary purpose, and the invention is not limited thereto. That is, within the moving time of the present gesture, if 6-18 valid MHI angles/directions can be continuously obtained, then the present gesture is regarded as a valid motion, and gesture control is performed according to the judged moving direction.

In order to achieve higher accuracy, an IR laser scan projector performs background IR calibration once per second. During background IR calibration, the IR laser scan projector does not emit IR light but still receives the background IR light from the external environment. If background IR calibration is performed once per second, then a black MHI is obtained every 60 MHIs. In the present embodiment of the invention, in counting the continuous quantity of the MHI angles/directions, the counting of the continuous quantity of the MHI angles/directions will be not reset if a black MHI is detected with 60 MHIs. However, the counting of continuous quantity of the MHI angles/directions will be reset if two or more than two black MHIs (no matter these black MHIs are continuous or not) are detected during one second.

Given that four MHI angles/directions are continuously obtained, the counting of continuous quantity of the MHI angles/directions will be not reset if the fifth MHI angle/direction cannot be obtained (that is, the fifth MHI is a black frame which is maybe due to background IR calibration) and the counting of continuous quantity will continue if the sixth MHI angle/direction can be obtained.

Given that four MHI angles/directions are continuously obtained, the counting of the continuous quantity of the MHI angles/directions will be reset if the fifth to the sixth MHI angles/directions cannot be obtained (that is, the fifth and the sixth MHIs both are black frames and at least one of the fifth and the sixth MHIs are not due to background IR calibration). Thus, the present gesture control will not be regarded as valid.

In terms of gesture motion, the present embodiment of the invention also considers that the middle stage of gesture can best represent the present gesture controlled by the user. The initial gesture, the gesture entering the capturing range of the video camera (or said a frame-entering gesture), the end/finishing gesture (representing finish of the motion), or the gesturing exiting the capturing range of the video camera (or said, a frame-exiting gesture) is normally different or even may be poles apart from the gesture in the middle stage of the gesture. That is because these gestures may be meaningless due to the acceleration or deceleration during the waving of the hand.

In the present embodiment of the invention, the MHI angles/directions are assigned by weights. By weight assignment, exemplarily but not restrictively, the quantity of MHIs in the middle stage of the gesture can be doubled or increased, and the quantity of MHIs in the initial stage or the ending stage can remain the same or can be reduced.

Suppose currently there are eight continuous valid MHI angles/directions: the first twos are upward (that is, there are two upward MHI angles/directions); the third to the sixth MHIs are rightward (that is, there are four rightward MHI angles/directions); the seventh to the eighth MHIs are downward (that is, there are two downward MHI angles/directions). After weight assignment, the present gesture control comprises: 2 (2*1=2) upward MHI angles/directions, 8 (4*2=8) rightward MHI angles/directions and 2 (2*1=2) downward MHI angles/directions. Anyone who is skilled in the technology field of the invention will understand that other embodiments of the invention can have other weight assignment, and are still within the spirit of the invention.

After weight assignment is performed, the MHI angle/direction with the largest quantity is used as a representative angle/direction of the current gesture control. In the previous example, the rightward angle/direction is regarded as the direction of the current gesture control.

In the present embodiment of the invention, after the judgment of current gesture control is completed, the next judgment of gesture control will not be performed immediately. This consideration is due to people's habitual reaction in gesture control. For example, people normally withdraw their hand leftward after waving their hand to the right. Therefore, after the present gesture control is judged as a "rightward motion", if the next gesture control is performed immediately, the gesture control will be judged as a "leftward motion". However, the "leftward motion" is the user's habitual reaction to a rightward motion, and is not necessarily the user's next control gesture for controlling the electronic device. In the present embodiment of the invention, suppose the electronic device takes 60 frames per second, the judgment of the next gesture control can be performed after 15 MHIs (this period is referred as a reset period) are elapsed.

Figure 2:
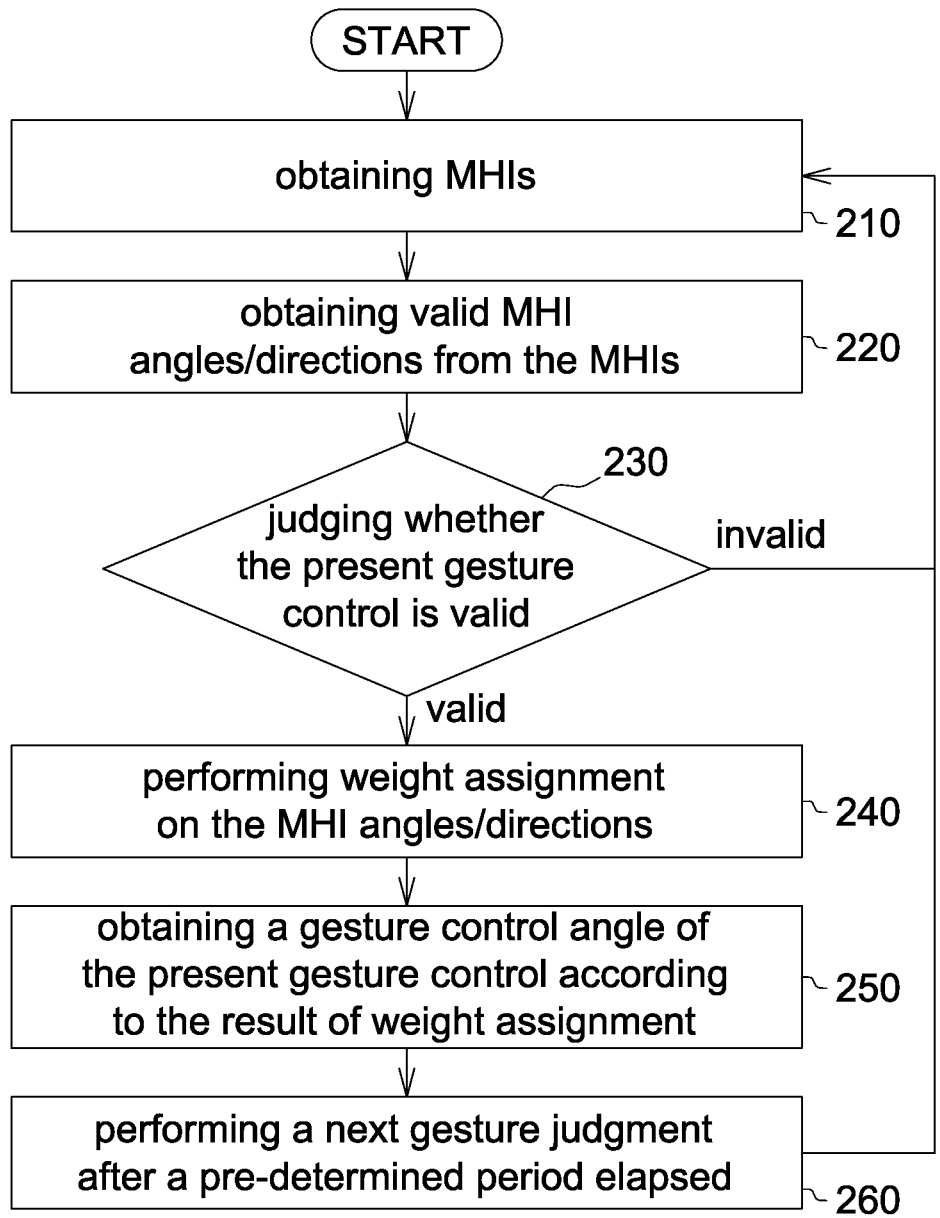
FIG. 2 is a flowchart of a gesture judgment method according to an embodiment of the present invention.

Referring to FIG. 2, a flowchart of a gesture judgment method according to an embodiment of the present invention is shown. In step 210 of FIG. 2, several MHIs are obtained. How to obtain MHI is not a focus in the present invention, details thereof are omitted here.

In step 220, valid MHI angles/directions corresponding to the MHIs in step 210 are obtained. Since the process of obtaining MHI angles/directions from the MHI frames is not a focus in the present invention, the details thereof are omitted here.

In step 230, whether the present gesture control is valid is judged. As disclosed above, whether the continuous quantity of MHI angles/directions is between a "low threshold of the MHI continuous quantity" and a "high threshold of the MHI continuous quantity" is judged. If any black frame occurs, then whether to terminate (or reset) the counting of the continuous quantity is judged. If the result of judgment in step 230 is valid, then the process proceeds to step 240; otherwise, the process proceeds to step 210, next gesture judgment is performed.

In step 240, weight assignment is performed on the MHI angles/directions. The details of weight assignment are as disclosed above and are not repeated here.

In step 250, the gesture control angle of the present gesture control is obtained according to the result of weight assignment. The details are as disclosed above and are not repeated here.

In step 260, next gesture judgment is performed after a pre-determined period (reset period) is elapsed.

In the present embodiment of the invention, the electronic device is for example but not limited by an IR laser projector. When the user controls the electronic device by using gesture judgment method according to an embodiment of the invention, the accuracy of gesture control judgment can be improved.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A gesture judgment method used in an electronic device having a frame capturing function, the gesture judgment method comprising:

obtaining a plurality of motion history image (MHI) angles/directions from a plurality of MHIs;
judging whether a current gesture control is valid according to the MHI angles/directions; and
performing weight assignment on the MHI angles/directions to obtain a judgment result of the current gesture control if the current gesture control is valid.

2. The gesture judgment method according to claim 1, wherein, the step of judging whether the current gesture control is valid comprises:

counting a continuous quantity of the MHI angles/directions; and
judging whether the current gesture control is valid according to the continuous quantity.

3. The gesture judgment method according to claim 2, wherein if the continuous quantity is between a high threshold and a low threshold, then the current gesture control is judged as valid.

4. The gesture judgment method according to claim 2, wherein, if the quantity of black MHIs occurring in the MHIs is larger than a predetermined value, then the continuous quantity is reset, wherein the black MHIs are MHIs caused by background IR calibration.

5. The gesture judgment method according to claim 2, wherein, if a black MHI only occurs once in the MHIs, then the continuous quantity is not reset, wherein the black MHI is an MHI caused by background IR calibration.

6. The gesture judgment method according to claim 1, wherein, the step of weight assignment comprises:

increasing a quantity of MHI angles/directions relating to a middle stage of a gesture;
maintaining or decreasing a quantity of MHI angles/directions relating to an initial gesture or a frame-entering gesture; and
maintaining or decreasing a quantity of MHI angles/directions relating to a finishing gesture or a frame-exiting gesture.

7. The gesture judgment method according to claim 6, wherein, after assignment, the MHI angle/direction having largest quantity is a representative angle/direction of the current gesture control.

8. The gesture judgment method according to claim 1, further comprising:

performing a next gesture judgment after a pre-determined period is elapsed, wherein a pre-determined number of MHIs are received in the pre-determined period and these received MHIs are excluded from said next gesture judgment.

\* \* \* \* \*